United States Patent [19]

Van Alstine

[11] Patent Number: 4,850,842
[45] Date of Patent: Jul. 25, 1989

[54] SCREW EXTRUDER

[75] Inventor: Terrance L. Van Alstine, Palatine Bridge, N.Y.

[73] Assignee: Nabisco Brands, Inc., Parsippany, N.J.

[21] Appl. No.: 179,466

[22] Filed: Apr. 8, 1988

[51] Int. Cl.⁴ ............................................. B29C 47/10
[52] U.S. Cl. ..................... 425/205; 366/76; 366/156; 426/3
[58] Field of Search ............... 425/145, 147, 200, 201, 425/205; 264/40.7; 426/3, 516, 517; 366/76, 156

[56] References Cited

U.S. PATENT DOCUMENTS

| | | | |
|---|---|---|---|
| 749,644 | 1/1904 | Thom | 366/156 |
| 1,852,005 | 3/1931 | Garbutt | 426/5 |
| 2,256,190 | 4/1934 | Bowman | 426/5 |
| 2,837,043 | 5/1956 | Grice et al. | 425/218 |
| 2,933,175 | 4/1960 | Gray | 198/579 |
| 3,589,308 | 6/1969 | Verhoevn | 425/101 |
| 3,857,963 | 12/1985 | Graff et al. | 426/5 |
| 3,908,032 | 9/1975 | Didelot et al. | 426/516 |
| 4,134,714 | 1/1979 | Driskill | 425/113 |
| 4,247,272 | 1/1981 | Anders | 425/147 |
| 4,269,582 | 5/1981 | Mella | 425/190 |
| 4,275,033 | 6/1981 | Schulte et al. | 366/156 |
| 4,286,882 | 9/1981 | Schiesser | 425/147 |
| 4,352,825 | 10/1982 | Cherukuri et al. | 426/6 |
| 4,381,184 | 4/1983 | Hurni et al. | 425/202 |
| 4,399,154 | 8/1983 | Puglia et al. | 426/5 |
| 4,467,969 | 8/1984 | Godfrey et al. | 366/76 |
| 4,504,511 | 3/1985 | Binley | 426/565 |
| 4,540,592 | 9/1985 | Myer et al. | 426/557 |
| 4,555,407 | 11/1985 | Kramer et al. | 426/5 |
| 4,573,898 | 3/1986 | Jones et al. | 425/145 |

Primary Examiner—Jay H. Woo
Assistant Examiner—Timothy A. Heitbrink
Attorney, Agent, or Firm—Richard Kornutik

[57] ABSTRACT

An extruder having an extruder head that forms a tubular passageway, an extruder screw rotatably disposed in the tubular passageway, and a first motor connected to the extruder screw for rotating that screw to force an extrudable material through the tubular passageway. The extruder further has a feed hopper for holding the extrudable material, and having an outlet in communication with an inlet of the extruder head for conducting the material thereinto. The feed hopper defines a supplemental opening adjacent the inlet of the extruder head, and a feed assist roller is rotatably supported on the extruder and extends partly through this supplemental opening to a location adjacent the inlet of the extruder head. A second motor is connected to the feed assist roller for rotating that roller to facilitate moving the extrudable material from the feed hopper and into the tubular passageway of the extruder head.

15 Claims, 5 Drawing Sheets

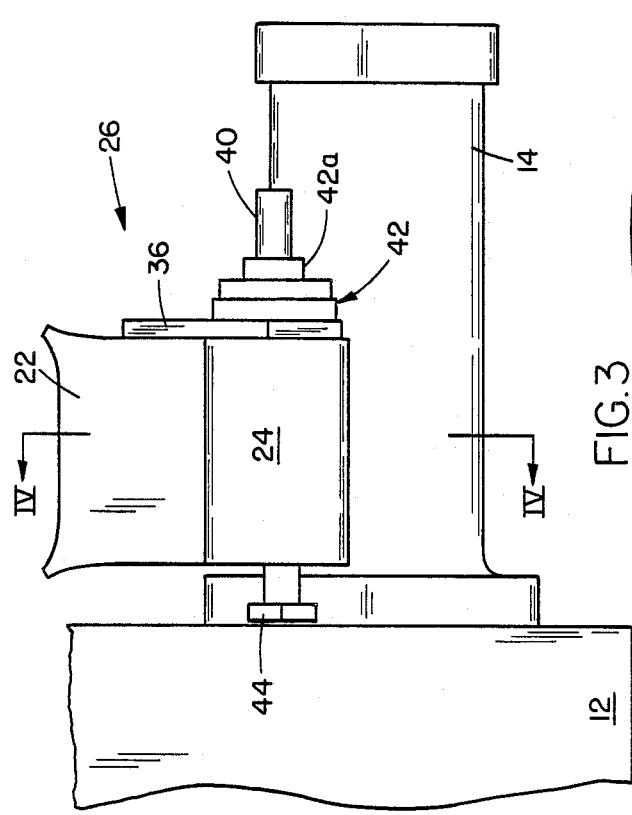
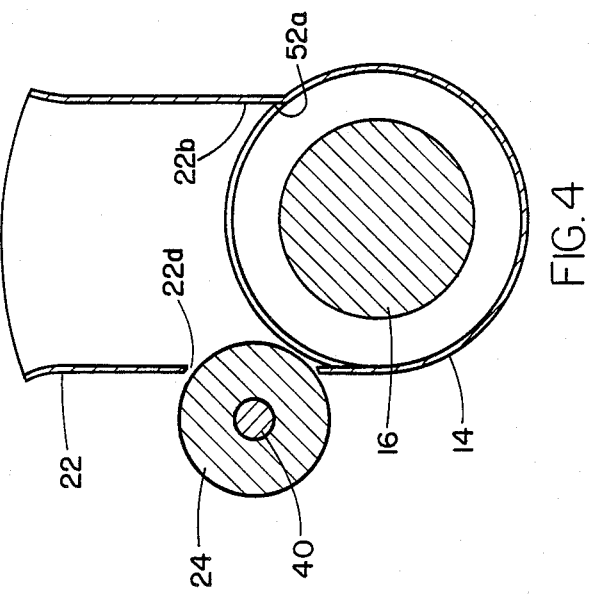
FIG. 3
FIG. 4
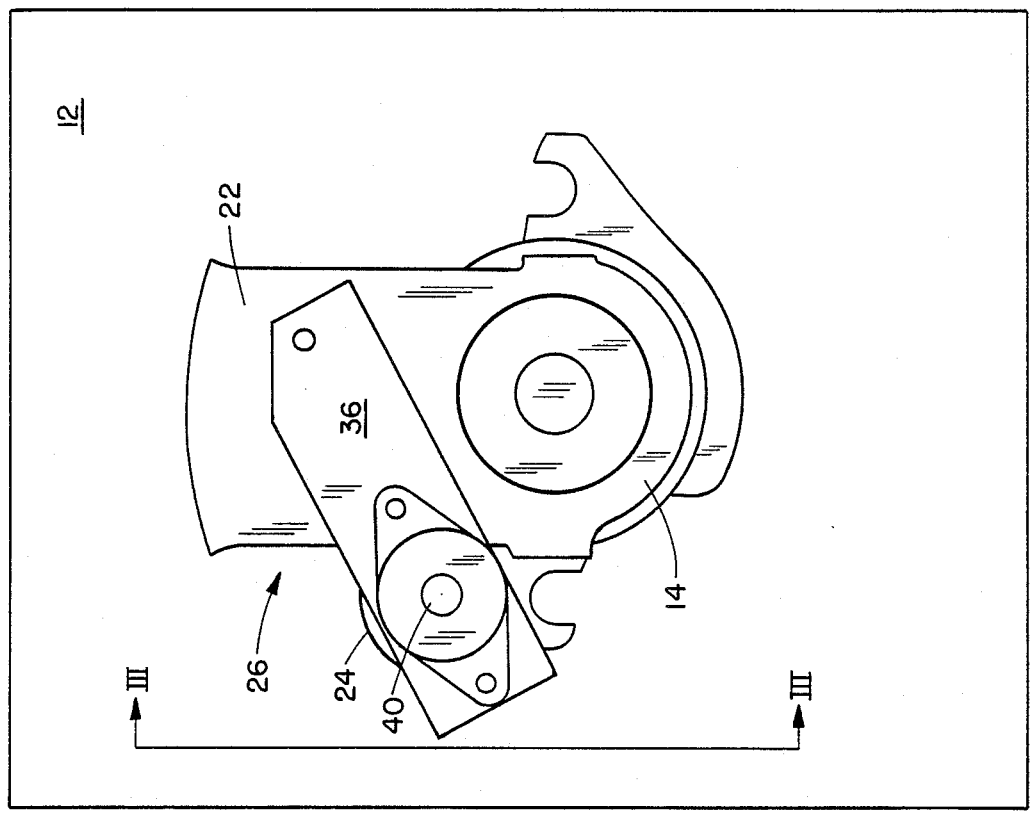
FIG. 2

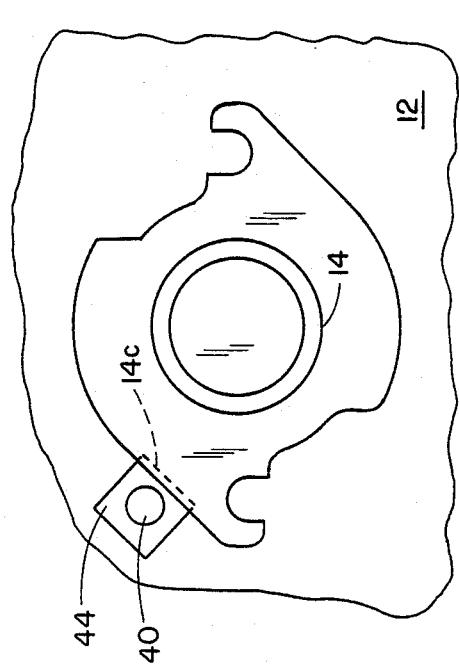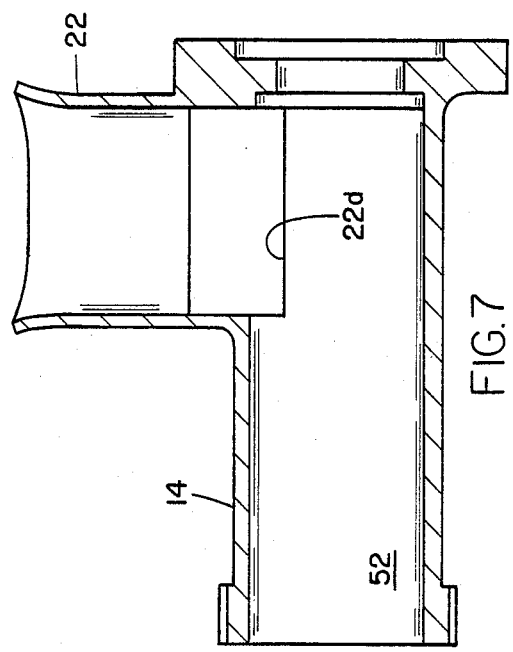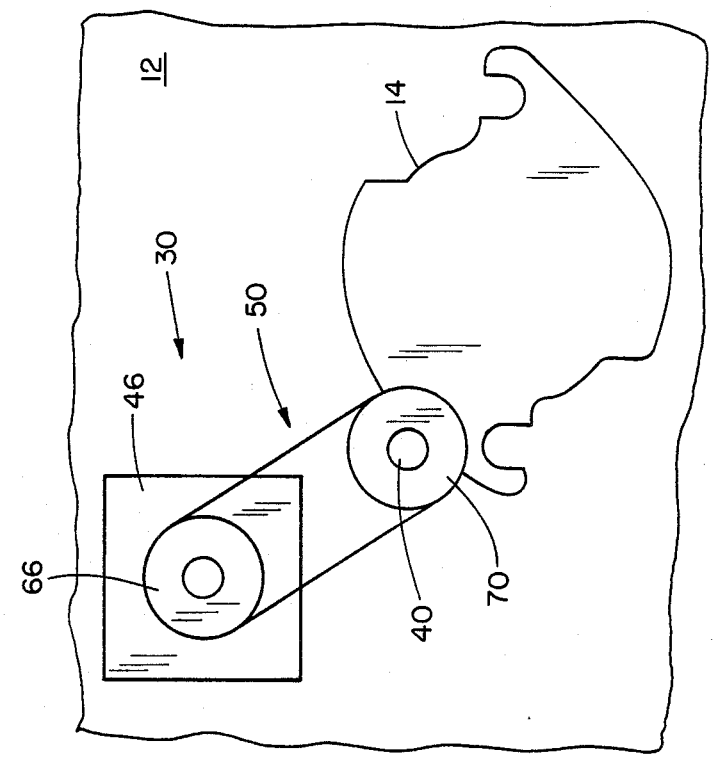

SCREW EXTRUDER

BACKGROUND OF THE INVENTION

This invention generally relates to screw extruders, and more particularly, to a screw extruder specifically designed to insure a smooth, regular flow of material from a feed hopper and into an extruder barrel.

Typically, a screw extruder comprises an elongated cylinder or barrel, a feed hopper mounted on one end of the barrel, and a rotatable screw axially extending within the barrel. In use, an extrudable material is fed into the hopper, which in turn passes that material into the extruder barrel, and the extruder screw is rotated in the barrel to advance the extrudable material therethrough. The material is then forced from the barrel and, usually, through a nozzle or die that forms the extrudable material into a desired shape.

Near the inlet of the extruder barrel, the rotating extruder screw tends to push the extrudable material toward one side of the barrel. As a result, some extrudable materials, such as some chewing gum compositions, do not always flow smoothly into the extruder barrel from the feed hopper, and instead extrudable material may accumulate on one side of the hopper in the area of the hopper outlet. This interferes with the flow of the extrudable material through the extruder, and in fact might stop that flow. Moreover, the extruder screw may push clogged material upward in the feed hopper, and under certain conditions, material may actually be pushed upwards out of that hopper.

SUMMARY OF THE INVENTION

An object of this invention is to improve screw extruders.

Another object of the present invention is to insure a smooth and regular flow of material, such as chewing gum compositions, into an extruder barrel from a feed hopper.

A further object of this invention is to provide an extruder with a feed assist roller to help push material into an extruder barrel from a feed hopper.

These and other objects are attained with an extruder comprising an extruder head that forms a tubular passageway, an extruder screw rotatably disposed in that tubular passageway, and drive means connected to the extruder screw for rotating that screw to force an extrudable material through the tubular passageway. The extruder further comprises a feed hopper for holding the extrudable material, and having an outlet in communication with an inlet of the extruder head for conducting the material thereinto. The feed hopper defines a supplemental opening adjacent the inlet of the extruder head, and a feed assist roller is rotatably supported on the extruder and extends partly through the supplemental opening to a location adjacent the outlet of the feed hopper. Supplemental drive means is connected to the feed assist roller for rotating that roller to facilitate moving the extrudable material from the hopper and into the tubular passageway of the extruder head.

Further benefits and advantages of the invention will become apparent from a consideration of the following detailed description given with reference to the accompanying drawings which specify and show preferred embodiments of the invention.

BRIEF DESCRIPTION OF THE DRAWINGS

FIG. 2 is a front view of the extruder.

FIG. 3 is a side view of a portion of the extruder, taken along line III—III of FIG. 2.

FIG. 4 is a cross-sectional view of the front portion of the extruder, taken along line IV—IV of FIG. 3.

FIG. 5 shows a detail of the extruder and is taken along line V—V of FIG. 1.

FIG. 6 shows another detail of the extruder and is taken along line VI—VI of FIG. 1.

FIG. 7 is a side, cross-sectional view of a head of the extruder.

DETAIL DESCRIPTION OF THE PREFERRED EMBODIMENT

Figure 1:
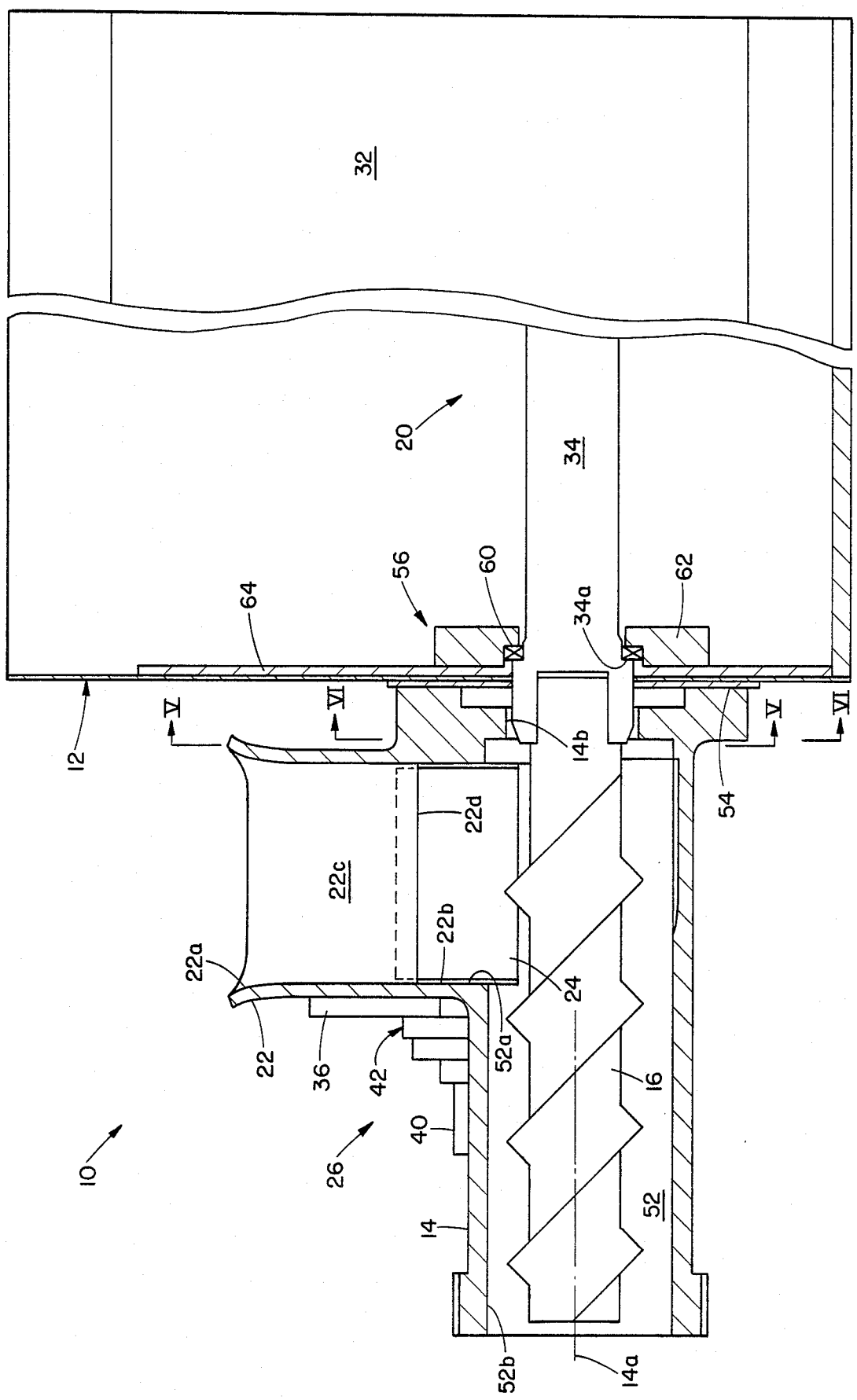
FIG. 1 is a side cross-sectional view of an extruder constructed according to a preferred embodiment of the present invention.

FIGS. 1 through 7 show extruder 10, which generally comprises support means 12, extruder head 14, extruder screw 16 and screw drive means 20. The extruder further comprises hopper 22, feed assist roller 24, roller mounting assembly 26, and roller drive means 30. Preferably, screw drive means 20 includes motor 32 and drive shaft 34; mounting assembly 26 includes mounting plate 36, roller shaft 40, and bearings 42 and 44; and roller drive means 30 includes motor 46 and transmission means 50.

Support means 12 provides the necessary support for the other parts of extruder 10. Any suitable support means may be used in the practice of this invention and, for instance, the support means may comprise an appropriate frame or stand. Preferably, though, support means 12 has a box-shape and also forms a protective enclosure or housing for motor 32 and drive shaft 34. In this case it is desirable to provide this housing with a removable section or portion such as a removable top, to provide access to motor 32 and drive shaft 34. Support means 12 may be constructed of any suitable material such as sheet metal or aluminum.

Extruder head 14 is connected to and is supported by support means 12, and the extruder head forms tubular passageway 52 having an inlet 52a for receiving food material and an outlet 52b for discharging the food material. Preferably, extruder head 14 is connected to, and extends horizontally forward from, a front side of support means 12; and passageway 52 has a generally uniform, circular cross-section, and defines a horizontal extruder axis 14a. A suitable die or nozzle (not shown) may be mounted on or placed in the front end of extruder head 14, over the outlet of tubular passageway 52, to form the edible material discharged therethrough into a particular shape. Extruder head 14 may be made of any suitable material such as a cast metal, and preferably the extruder head is securely bolted to support means 12. A back end of the extruder head forms a central opening 14b to receive drive shaft 34, and a seal 54 may be disposed between the back end of the extruder head and support means 12 to prevent food material from leaking out through the interface between the extruder head and the support means.

Hopper 22 is provided to receive and hold the edible material and to conduct that material into tubular passageway 52. More specifically, the hopper has an inlet 22a for receiving the food material, an outlet 22b in communication with inlet 52a of tubular passageway 52 for conducting the edible material thereinto, and an internal passage 22c for holding the extrudable material and conducting that material from inlet 22a to outlet 22b. With the embodiment of the invention shown in FIGS. 1-7, hopper 22 is integrally molded with extruder head 14 and extends directly upward therefrom and the hopper has a generally uniform, rectangular horizontal cross-section. Other arrangements may be used, though, and, for example, the hopper may be bolted to the extruder head.

Extruder screw 16 is rotatably disposed in tubular passageway 52, and drive means 20 is supported by support means 12 and connected to the extruder screw to rotate that screw to force the extrudable material through passageway 52. Any suitable drive means 20 may be employed on extruder 10, and the drive means may be connected to the extruder screw in any appropriate manner. With the embodiment of extruder 10 shown in the drawings, a conventional electric motor 32 is securely connected to and located inside support means 12, and drive shaft 34 is operatively connected to the motor such that the motor rotates the drive shaft. Drive shaft 34 extends forward from motor 32, through a forward opening in the support means, and into or through back opening 14b of extruder head 14.

Preferably, the forward end of drive shaft 34 is rotatably supported by assembly 56, which in turn is securely supported by a front side of support means 12. Assembly 56 comprises a thrust bearing 60, which extends around the drive shaft and directly engages a back side of a shoulder 34a on the forward portion of the drive shaft. Bearing 60 is housed in and supported by a bearing housing 62, and this housing is securely welded or bolted to a load transfer plate 64, which itself is bolted or welded to the front side of support means 12.

Extruder screw 16 is rotatably supported in passageway 52 and is connected to drive shaft 34 in any suitable way, and preferably the extruder screw is supported for rotation about the axis 14a of the extruder head 14. As illustrated in FIG. 1, the extruder screw is securely connected to the forward end of the drive shaft so that this shaft both provides the necessary support for the extruder screw, and rotates that screw unitarily with the drive shaft. If desired, however, additional support means may be provided for the extruder screw. As shown in FIG. 1, extruder screw 16 comprises an elongated cylindrical body having a uniform outside diameter, and a land helically extending around the screw body. The pitch of the land varies from the back to the front of the screw; and adjacent land convolutions are spaced apart about 3 7/8 inches at the back end (the right end as viewed in FIG. 1) of the screw, and about 1⅞ inches at the front end (the left end as viewed in FIG. 1) of the screw. As will be appreciated by those of ordinary skill in the art, other extruder screw shapes and designs may be employed in the extruder of this invention.

With particular reference to FIGS. 1 and 4, hopper 22 forms a supplemental opening 22d adjacent a rearward portion of one side of extruder screw 16, and feed assist roller 24 is rotatably supported on extruder 10 and extends partly through this supplemental opening and into the interior of the hopper. Supplemental opening 22d is formed by a lower side portion of hopper 22, and feed assist roller 24 is supported outside of the hopper, closely adjacent the supplemental opening so that a portion of the assist roller extends through that opening. Preferably, feed assist roller 24 extends across both hopper outlet 22b and passageway inlet 52a and to a position closely adjacent extruder screw 16. Furthermore, preferably roller 24 is supported for rotation about an axis parallel to the axis 14a of the extruder head 14, and supplemental opening 22d has a generally rectangular shape.

With particular reference now to FIGS. 2 and 3, feed assist roller 24 is supported by mounting assembly 26. More specifically, mounting plate 36 is securely bolted to a front side of hopper 22 and, as viewed in FIG. 2, the mounting plate extends downwardly and leftwardly of the hopper. The lower, leftward portion of the mounting plate forms a through opening (not shown), and flange bearing 42 is bolted to a front side of the mounting plate, over this through opening. Rear bearing block 44 is securely connected to extruder head 14, rearward of supplemental opening 22d, and the bearing block 44 seats in a recess 14c (shown in FIG. 6) formed in a back flange portion of the extruder head. Roller support shaft 40 axially extends between and is rotatably supported by flange bearing 42 and bearing block 44, and preferably the axis of shaft 40 is parallel to the axis 14a of extruder head 14. A front portion of shaft 40 is fixed to an inner race 42a of bearing 42 to hold the shaft against axial or thrust movement.

Roller 24 has a hollow, tubular shape and is mounted on shaft 40 in a relatively close fit therewith, and the roller is connected to shaft 40 for unitary rotation with this shaft. Preferably, the length of the feed assist roller is slightly less than the length of supplemental opening 22d, and the feed assist roller extends through this opening with the front and back sides of the roller closely adjacent the front and back edges, respectively, of the supplemental opening. The diameter of roller 24 is greater than the width or height of supplemental opening 22d; however, the feed assist roller is positioned so that upper and lower surfaces of the roller are closely adjacent, but slightly spaced from, the upper and lower edges, respectively, of the supplemental opening.

Supplemental or roller drive means 30 is connected to the feed assist roller to rotate this roller to facilitate moving the food material from hopper 22 and into passageway 52 of extruder head 14, and any suitable drive means 30 may be employed to rotate roller 24. For example, with reference to FIG. 5, second motor 46, which may be any conventional electric motor, is securely connected to the outside of support means 12 and is drivingly connected to roller shaft 40 by transmission means 50, which preferably includes sprockets 66 and 70 and chain 72. Sprocket 66 is mounted on an output shaft of motor 46 for rotation with that shaft, sprocket 70 is mounted on roller 42 for rotation therewith, and chain 72 is drivingly mounted on both sprockets 66 and 70. In use, motor 46 rotates its shaft, which in turn rotates sprocket 66, and this drives chain 72 around sprocket 66. This causes chain 72 to rotate sprocket 70, and this sprocket rotates shaft 40 and feed assist roller 24. Alternatively, a suitable transmission means (not shown) may be used to connect motor 32 or drive shaft 34 to roller shaft 40 so that motor 32 is also used to rotate feed assist roller 24, eliminating the need for a separate motor to drive the feed assist roller. It may be preferred, but not necessary, to rotate the feed assist roller at the same rotational speed as extruder screw 16, and it is preferred to rotate roller 24 clockwise as viewed in FIG. 4, and in a direction opposite to the direction of rotation of extruder screw 16.

In operation, an extrudable material is fed into and collected in hopper 22, and drive means 20 and 30 rotate extruder screw 16 and feed assist roller 24, respectively. The extrudable material passes from the hopper and into tubular passageway 52, with the feed assist roller insuring that the food material does not become blocked adjacent the lower portion of the hopper and insuring that the food material flows smoothly and evenly into the tubular passageway. The rotation of extruder screw 16 forces the food material forward through the tubular passageway and then outward from the extruder head.

As roller 24 rotates, material in hopper 22 may adhere to the roller, and it is desirable to prevent this material from being carried out of the feed hopper and scraped off roller 24 outside of the feed hopper. For this reason, with particular reference to FIG. 4, preferably the vertical distance or space between the roller and the bottom horizontal edge of opening 22d is less than the vertical distance or space between the roller and the top horizontal edge of opening 22d. In this way, as roller 24 rotates, the bottom edge of opening 22d scrapes material off the roller while that material is still inside the feed hopper. Any material remaining on the feed assist roller is carried around by that roller past the upper edge of opening 22d and back into the feed hopper without being scraped of the roller, outside the feed hopper, by the top edge of opening 22d.

Extruder 10 works very well with conventional chewing gum materials; and, for example, several suitable chewing gum formulations that may be used in the practice of this invention are described in detail in U.S. Pat. Nos. 4,352,825 and 4,399,154. In particular, the chewing gum formulation may include a gum base, a premixed recrystallized combination of at least two sweetners, including solids and liquid sweetners, which preferably include sucrose and/or sorbitol and/or hydrogenated starch hydrolysate, and high fructose syrup alone or together with liquid glucose, hydrogenated starch, hydrolysate syrup, corn syrup, sorbitol syrup and/or invert sugar, in the recrystallized mixture, and flavors, softners and other conventional chewing gum ingredients. The amount of sorbitol in the chewing gum formulation may be increased to increase the hardness and to improve the handleability of the chewing gum.

Figure 8:
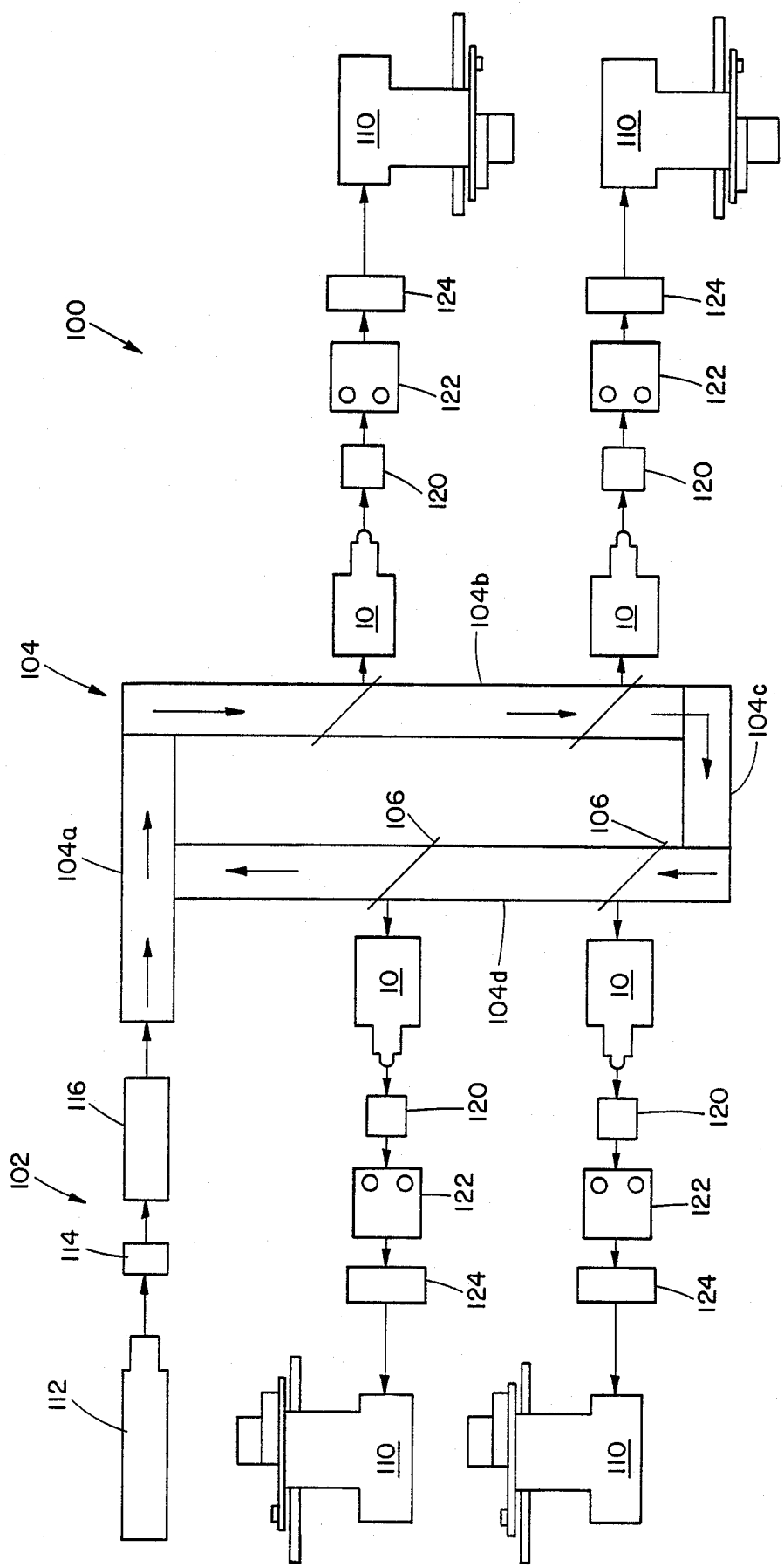
FIG. 8 is a schematic diagram showing a system for handling chewing gum and using the extruder of FIGS. 1-7.

FIG. 8 outlines system 100 for processing chewing gum and including a multitude of extruders 10. More specifically, system 100 is designed to form a multitude of small pieces of chewing gum from a bulk gum composition or mass, and to wrap each of these gum pieces separately. System 100 includes gum segment forming means 102, conveyor means 104, a plurality of extruders 10, extruder feed means 106, and a plurality of gum wrapping units 110. Preferably, gum segment forming means 102 includes primary extruder 112, slicer 114 and cooling tunnel 116; and system 100 further includes a plurality of powder applicators 120, pre-sizers 122 and metal detectors 124.

Gum loaves or any other suitable type of bulk gum mass are fed to extruder 112, which extrudes the gum into a multitude of continuous, primary ropes, each of which has a diameter of about one inch. Slicer 114 cuts each of these primary ropes into a multitude of segments, each of which is about 3 inches long; and these gum segments are passed through optional cooling tunnel 116, which may be used to cool the gum, for instance, to a temperature slightly below the ambient temperature. From the cooling tunnel, the gum segments are fed onto conveyor means 104, which carries the gum segments along a path.

Extruders 10 are located along the conveyor means to receive the gum segments therefrom, and a respective one feeding means 106 is located adjacent each extruder 10 to feed gum thereinto from the conveyor means. Each extruder 10 extrudes a secondary, continuous rope of gum, which is passed through a powder applicator 120, a pre-sizer 122 and a metal detector 124. This extrusion process raises the temperature of the gum, and preferably the temperature of the gum fed to the extruders 10 is controlled so that the temperature of the gum is approximately ambient temperature as it is discharged from those extruders. From the metal detectors 124, each secondary rope of gum is fed to a wrapping unit 110, which cuts the rope into small pieces and individually wraps each such piece.

Any suitable conveyor means 104 may be used in a practice of this invention. Preferably, the conveyor means forms a closed loop to continuously move gum segments around a closed path, and so that segments of gum on the conveyor means that are not fed into any of the extruders 10 on one pass around the conveyor means, are recirculated around that conveyor means. For instance, the conveyor means may comprise four legs 104a–d, with each leg comprising an endless belt; and each leg may form a respective one side of a rectangle or square with leg 104a also forming an extension portion that receives the gum segments from cooling tunnel 116.

Figure 10:
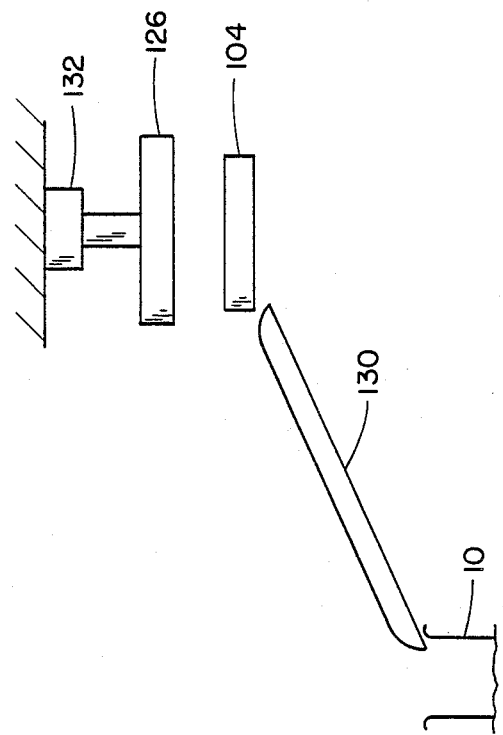
FIG. 10 is a side view of FIG. 9, taken along line X—X thereof.
Figure 9:
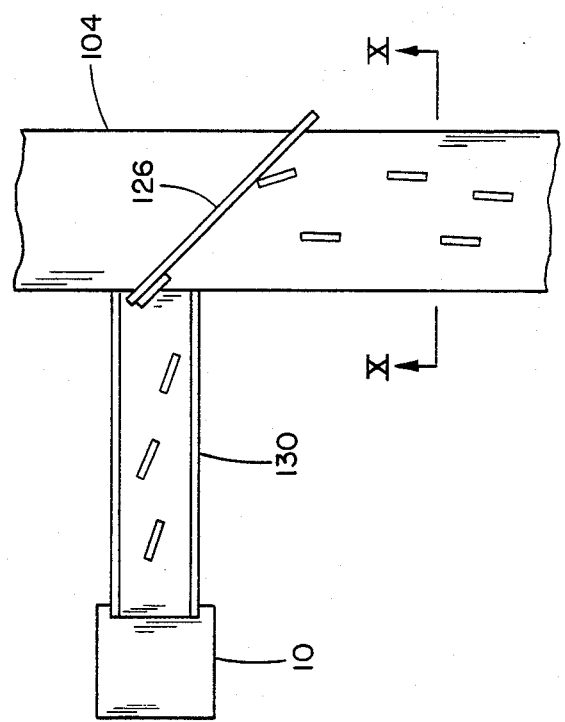
FIG. 9 shows in greater detail one portion of the system of FIG. 8.

Any suitable mechanisms 106 may be employed to feed gum to extruders 10 from conveying means 104, and FIGS. 9 and 10 illustrate one such mechanism. With this arrangement, each feeding means 106 comprises a diverter bar 126 supported for movement between engaged and disengaged positions. In the engaged position, the diverter bar guides gum segments on the conveyor means 104 into a feed chute 130 that, in turn, guides the gum segments into an inlet hopper of an adjacent extruder 10; and in the disengaged position, the diverter bar allows the gum segments on the conveyor means to move past that adjacent extruder.

Preferably, each diverter bar 126 is supported above the conveyor means 104 for upward and downward reciprocating movement, respectively, away from and toward the conveyor means. With this preferred embodiment, when the diverter bar is in its disengaged position, the bar is spaced above the conveyor means a distance sufficient so that the gum segments on the conveyor means pass underneath the diverter bar without contacting that bar; and when the diverter bar is in its engaged position, that bar is closely adjacent, but slightly spaced above, the conveyor means, and the diverter bar acts to push gum segments from the conveyor means into an adjacent extruder feed chute. The diverter bars are supported in any suitable way, and any acceptable means 132 such as an electric motor or a hydraulic or pneumatic cylinder may be used to move the diverter bars between their engaged and disengaged positions. Preferably, as shown in FIG. 9, each diverter bar is positioned, at least in its engaged position, so that the bar slants laterally across the conveyor means and extends slightly beyond the lateral edges of the conveyor means.

With particular reference to FIG. 10, preferably, conveyor means 104 is located above the inlet hoppers of extruders 10 so that the gum segments move into those hoppers from the conveyor means under the force of gravity. It may also be desirable to provide means (not shown) to vibrate feed chutes 130 to help insure that the gum segments move evenly and smoothly down those chutes.

Movement of each diverter bar 126 between its engaged and disengaged positions may be controlled by a sensor (not shown) that senses the amount or level of gum in the adjacent extruder. In particular, when the amount or level of gum in the adjacent extruder falls below a preset value, this sensor may activate motive means 132 to move the diverter bar into its engaged position to feed more gum to the extruder; and when the amount or level of gum in the extruder rises above a given value, this sensor may actuate motive means 132 to move the diverter bar back into its disengaged position. For example, such a sensor may comprise a photosensor located at a given height on or in the feed hopper of the extruder. This same sensor may also be used to control the vibration means for the feed chute to the extruder; and more specifically, to activate and deactivate that vibration means, respectively, as the diverter bar moves toward or into its engaged and disengaged positions.

Any suitable gum extruder may be used as primary extruder 112, although preferably, as mentioned above, this extruder extrudes multiple continuous ropes of gum. Likewise, conventional gum slicers, cooling tunnels, powder applicators, metal detectors, pre-sizers, and wrapping units may be used in system 100. Numerous such devices are well known to those of ordinary skill in the art, and it is unnecessary to describe these devices herein in detail.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

I claim:
1. An extruder, comprising:
support means;
an extruder head connected to and supported by the support means, and forming a tubular passageway having an inlet and an outlet;
an extruder screw rotatably disposed in the tubular passageway;
screw drive means connected to the extruder screw for rotating said screw to force an extrudible material through the tubular passageway and through the outlet thereof;
a hopper including an exterior wall member defining
(i) an inlet for receiving the extrudible material,
(ii) an outlet in communication with the inlet of the tubular passageway for conducting the extrudible material thereinto,
(iii) an internal passageway for holding the extrudible material and for conducting the extrudible material from the hopper inlet to the hopper outlet, and
(iv) a supplemental opening extending completely through the wall member, adjacent the inlet of the tubular passageway;
a feed assist roller extending through the supplemental opening to a location adjacent the extruder screw;
means rotatably mounting the feel assist roller on the extruder; and
roller drive means connected to the feed assist roller for rotating said roller to facilitate moving the extrudible material from the hopper and into the tubular passageway.

2. An extruder according to claim 1, wherein:
the tubular passageway defines an extruder axis;
the extruder screw is supported for rotation about said extruder axis; and
the feed assist roller is supported for rotation about an axis parallel to said extruder axis.

3. An extruder according to claim 1, wherein the means rotatably mounting the feed assist roller on the extruder includes:
a mounting plate connected to the hopper; and
means rotatably connecting the feed assist roller to the mounting plate.

4. An extruder according to claim 3, wherein:
the means rotatably connecting the feed assist roller to the mounting plate includes a roller shaft rotatably supported by the mounting plate; and
the feed assist roller is secured on the roller shaft for rotation therewith.

5. An extruder according to claim 4, wherein:
the means rotatably connecting the feed assist roller to the mounting plate further includes a front bearing connected to and supported by the mounting plate, and rotatably supporting a front end of the roller shaft; and
the means rotatably mounting the feed assist roller on the extruder further includes a back bearing connected to and supported by the extruder head, and rotatably supporting a back end of the roller shaft.

6. An extruder according to claim 5, wherein:
the extruder head includes a back portion defining a recess; and
the back bearing is located rearward of the supplemental opening and is held in said recess.

7. An extruder according to claim 4, wherein the roller drive means includes means connecting the screw drive means to the roller shaft to rotate the roller shaft and the feed assist roller.

8. An extruder according to claim 1, wherein the roller drive means includes:
a motor supported by the support means; and
transmission means drivingly connecting the motor to the feed assist roller.

9. An extruder according to claim 8, wherein:
the means rotatably mounting the feed assist roller includes a roller shaft rotatably supporting the feed assist roller;
the motor includes a rotatable motor shaft; and
the transmission means includes
(i) a first sprocket mounted on the motor shaft for rotation therewith,
(ii) a second sprocket mounted on the roller shaft for rotation therewith, and
(iii) a chain drivingly mounted on the first and second sprockets to rotate the second sprocket with the first sprocket.

10. An extruder according to claim 1, wherein the feed assist roller extends across the hopper outlet and the inlet of the tubular passageway.

11. An extruder according to claim 10, wherein the feed assist roller extends to a position closely adjacent the extruder screw.

12. An extruder according to claim 1, wherein the feed assist roller is supported for rotation about a roller axis located outside of both the hopper and the extruder head.

13. An extruder according to claim 12, wherein:

the supplemental opening has a rectangular shape, and includes front, back, top and bottom edges;

the feed assist roller has front and back sides and an outside surface;

the feed assist roller extends through the supplemental opening with the front and back sides of the roller closely adjacent the front and back edges, respectively, of the supplemental opening, and with the outside surfaces of the roller closely adjacent the top and bottom edges of the supplemental opening.

14. An extruder according to claim 12, wherein:

the wall member of the hopper includes generally planar front and back portions and generally planar first and second side portions; and the supplemental opening is formed by the first side portion.

15. An extruder according to claim 14, wherein:

the means rotatably mounting the feed assist roller includes (i) a mounting plate secured to the front portion of the wall member of the hopper, and extending downwardly and laterally to a position laterally outward of the first side portion of the hopper, (ii) a back bearing connected to and supported by the extruder head, rearward of the supplemental opening, (iii) a roller shaft having a first end rotatably supported by the mounting plate, extending rearward therefrom past the supplemental opening, and having a second end rotatably supported by the back bearing; and the feed assist roller is secured on the roller shaft for rotation therewith.

* * * * *